United States Patent [19]

Sale

[11] 4,030,229
[45] June 21, 1977

[54] BIRD TRAP

[76] Inventor: Morris D. Sale, 388 Sunset Way, Palm Springs, Calif. 92262

[22] Filed: June 4, 1976

[21] Appl. No.: 692,864

[52] U.S. Cl. .................................................. 43/69
[51] Int. Cl.² ..................................... A01M 23/04
[58] Field of Search ..................... 43/60, 65, 69, 70

[56] References Cited

UNITED STATES PATENTS

| | | | |
|---|---|---|---|
| 1,145,982 | 7/1915 | Etzel | 43/69 |
| 1,347,407 | 7/1920 | Rohlff | 43/69 |
| 2,518,614 | 8/1950 | Hain | 43/69 |

*Primary Examiner*—Warner H. Camp
*Attorney, Agent, or Firm*—Christie, Parker & Hale

[57] ABSTRACT

A bird trap having a pair of open mesh wire screen cages spaced apart to provide a passage between the cages. An overhead tunnel extending across the tops of the two cages bridges the space between them. Openings in the tops of the two cages communicate with the tunnel. Entrance into the first cage is through an opening in the side of the cage from the space forming the passage between the cages. A trap door in the opening from the tunnel to the second cage traps the birds in the second cage.

6 Claims, 7 Drawing Figures

BIRD TRAP

FIELD OF THE INVENTION

This invention relates to traps for birds.

BACKGROUND

While various traps for catching different types of birds have been proposed, there is a need for a humane, unmechanized bird trap which does not incorporate a trigger or require the setting or resetting of a trap mechanism with each bird that is trapped.

The present invention is directed to a bird trap which is inexpensive to manufacture and simple to set up. It requires no trigger mechanism that needs resetting or requires a source of energy such as a spring, battery, or the like, to operate the trap. It is capable of trapping and collecting a number of birds over a period of time without damage or harm to the birds. Unwanted or protective species can be released from the trap unharmed. The trap can be used for various purposes, such as collection of birds for examination, banding, relocation, or other scientific purposes, controlling nuisance species such as pigeons, starlings, and English sparrows, reducing bird populations in the vicinity of airports where they otherwise may create an aircraft hazard, and segregating out diseased or destructive species of birds, for example.

SUMMARY OF THE INVENTION

In brief, the present invention incorporates a pair of open mesh wire screen cages which are fully enclosed to form two compartments. The cages are positioned in spaced relationship to provide an open narrow passage between the cages. An overhead tunnel extending across the top of the two cages bridges the space between them, the first cage having an opening through the side of the cage from the space between the cages by which the birds enter the interior of the first cage. The first cage has an opening through the top into the overhead tunnel. The second cage has an opening through the top from the overhead tunnel in which is located a trap door by which the birds drop down into the second cage from the tunnel and are prevented from leaving the second cage.

DESCRIPTION OF THE DRAWINGS

For a better understanding of the invention reference should be made to the accompanying drawings, wherein.

DETAILED DESCRIPTION

Figure 1:
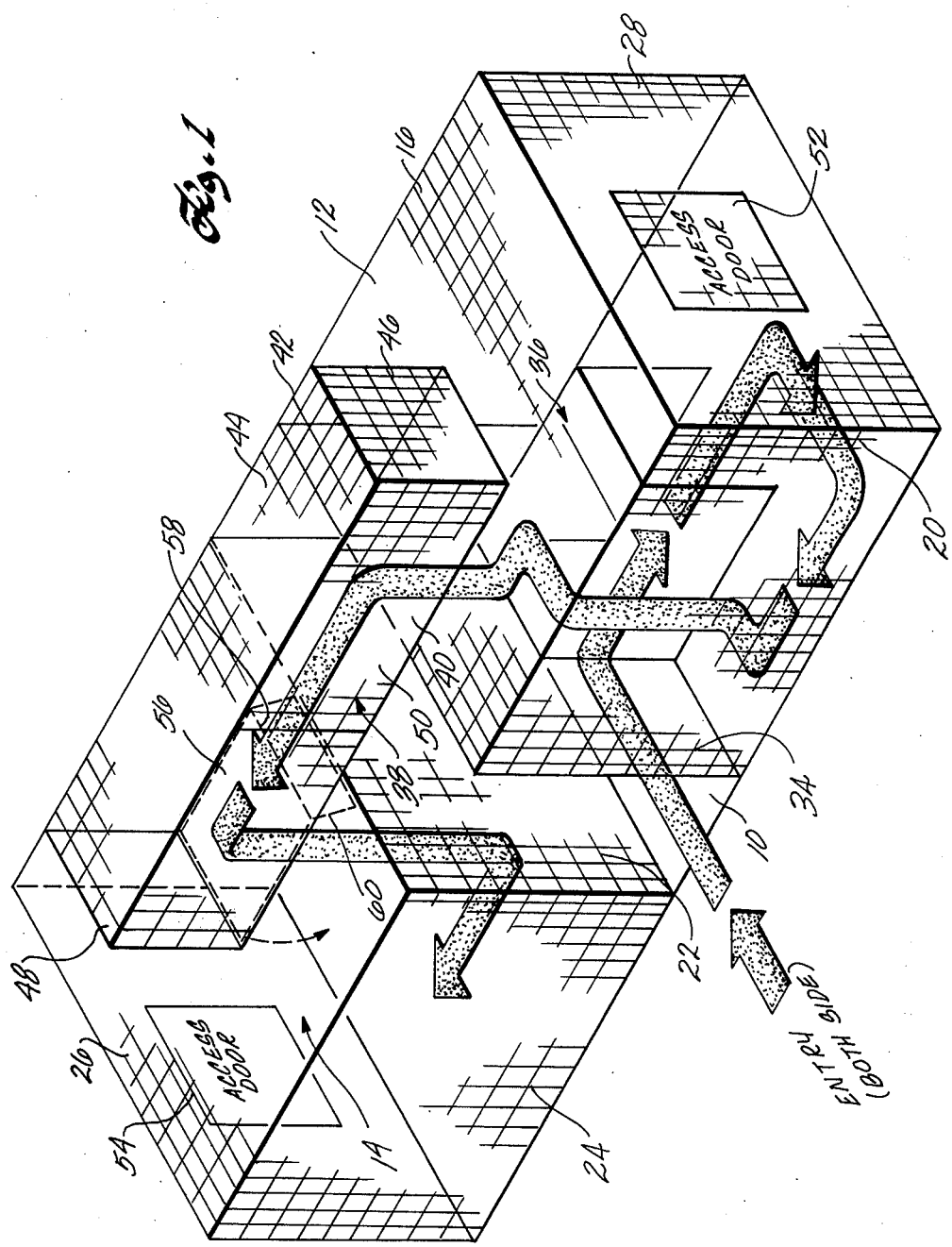
FIG. 1 is a perspective view of a preferred embodiment of the trap.
Figure 2:
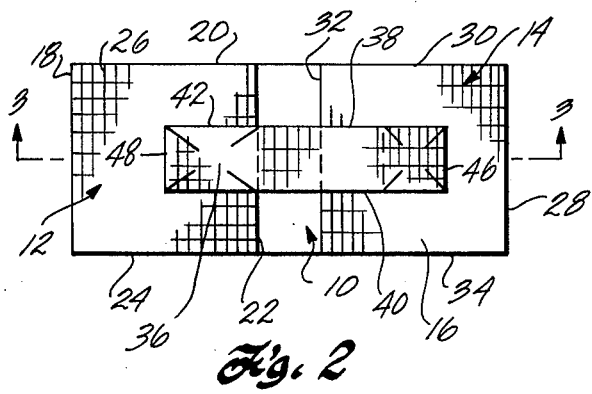
FIG. 2 is a plan view of the trap.

Referring to the drawings in detail, the numeral 10 indicates the base of the trap which is a generally rectangular piece of wire mesh screen. The base 10 forms the bottom wall of two cages, indicated at 12 and 14. The cage 12 has a top wall 16 and four side walls 18, 20, 22, and 24. The cage 14 similarly has a top wall 26 and four side walls 28, 30, 32 and 34. The walls and ceiling of the cages 12 and 14 are also made of open mesh screen. The two cages are positioned on the base 10 with the respective adjacent walls 22 and 32 spaced apart to form an open passage between the two cages. The passage allows birds to pass freely between the two cages.

The cage 12 is provided with an opening in the wall 22 which communicates with a short entry tunnel 36, also formed of open mesh screen. The end of the tunnel opens into the interior of the cage 12, the top of the tunnel structure being positioned substantially half way between the top and bottom of the cage. The top of the cage 12 immediately above the entry tunnel 36 has an opening communicating with an overhead tunnel 38. The overhead tunnel 38 extends above both cages 12 and 14, bridging the space between the two cages. The tunnel has side walls 40 and 42 joined by a top wall 44 and end walls 46 and 48. The overhead tunnel also has a bottom wall 50 bridging the space between the two cages. The top wall 26 of the cage 14 has an opening communicating with the overhead tunnel 38.

In operation, suitable bait is placed in the first cage 12 to induce the bird to enter through the entry tunnel 36. Once in the cage 12, the bird instinctively tries to get out through the perimeter or the top, rather than returning through the entry tunnel 36. The bird's natural tendency is to hop up on top of the entry tunnel 36 and from there to enter the overhead tunnel 38. Thus the bird is directed toward the end of the overhead tunnel and back down into the second cage 14. The cages 12 and 14 are provided with access doors 52 and 54 in the respective side walls 18 and 28. The access doors permit removal of the birds trapped in the cages.

Escape from the second cage can be prevented by providing a trap door 56 hinged along one edge to the floor of the overhead tunnel 38, as indicated at 58. The door 56 is counterbalanced by a portion 60 of the door which extends at an angle downwardly into the cage 14. The weight of the counterbalancing portion 60 is sufficient to cause the trap door 56 to rotate into a horizontal position in which the trap door 56 is flush with the bottom of the overhead tunnel. When the bird steps on the top of the trap door 56, the weight of the bird overcomes the counterweight of the portion 60 causing the trap door to swing down into the interior of the cage 14 forming an inclined ramp leading the bird down into the second cage. When the bird hops off the trap door into the second cage 14, the trap door swings back into position closing off any escape of the bird.

Figure 5:
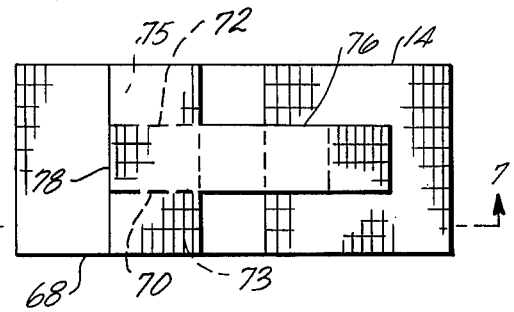
FIG. 5 is a plan view of an alternative embodiment.
Figure 3:
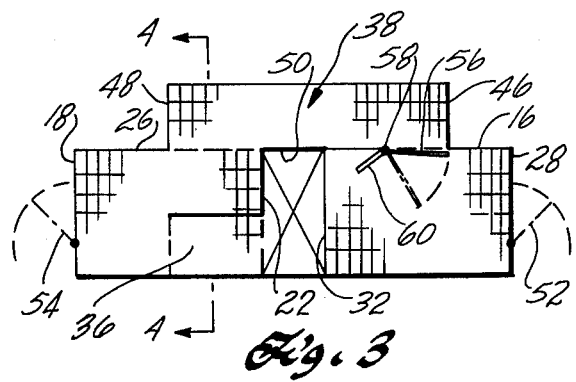
FIG. 3 is a sectional view taken substantially on the line 3—3 of FIG. 2.
Figure 6:
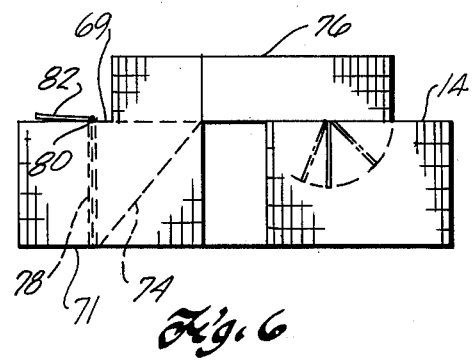
FIG. 6 is an elevational view of the alternative embodiment.
Figure 4:
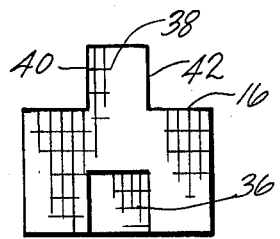
FIG. 4 is a sectional view taken substantially on the line 4—4 of FIG. 3.
Figure 7:
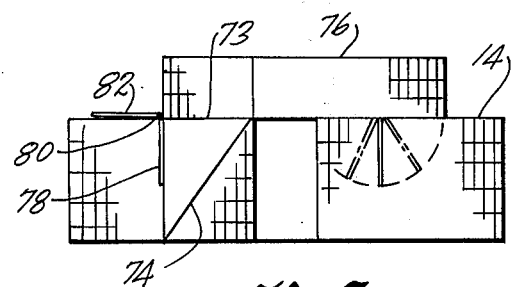
FIG. 7 is a sectional view taken substantially on the line 7—7 of FIG. 5.

An alternative arrangement is shown in FIGS. 5, 6, and 7, in which the first cage 68 is modified such that the entry tunnel consists of a pair of side walls 70 and 72 which extend between the top and bottom walls 69 and 71 of the cage. Ramps 74 are provided on either side of the walls 70 and 72 which extend from the floor of the first cage 68 at an angle upwardly to the top wall of the cage. The top wall of the cage has two openings 73 and 75 immediately above the two ramps. The overhead tunnel 76 is T-shaped so as to traverse the full width of the cage 68 and enclose the two openings 73 and 75. Thus a bird entering through the tunnel can move upwardly on one of the ramps 74 on either side of the entry tunnel into the overhead tunnel 76. The birds are then directed by the overhead tunnel into the second cage 14 in the identical manner described above in connection with FIGS. 1–4. A counterbalanced door 78 may be supported by a hinge 80 to the top wall 16 of the cage 12. The door 78 hangs down across the entry formed by the tunnel wall 70 and 72. A counterbalancing portion 82 keeps the door in the normally closed position. A bird attempting to enter the cage 12, when attracted by the bait, pushes the counterbalanced door 78, causing it to swing upwardly and out of the way to permit the bird to enter the first cage. When the door closes behind the bird, the bird seeks escape by means of a ramp 74.

What is claimed is:

1. A bird trap comprising first and second cages made of open mesh wire screen forming two cages in closely spaced relationship, an open passage extending between the two cages, and an overhead tunnel extending across the tops of the two cages and bridging the space between them, the first cage having an opening in the side of the cage from the space between the cages into the interior of the cage and an opening through the top of the cage into the overhead tunnel, the second cage having an opening through the top of the cage into the overhead tunnel.

2. The trap of claim 1 further including normally closed access doors in both cages for removal of birds trapped in the cages.

3. The trap of claim 1 further including a wire mesh entrance tunnel extending inside the first cage from said opening in the side of the cage.

4. The trap of claim 3 wherein the top of the entrance tunnel is positioned directly below the opening in the top of the first cage, the top of the entrance tunnel being at an intermediate level between the top and bottom of the first cage.

5. The trap of claim 3 further including a ramp in the first cage extending from the floor of the cage up to the overhead tunnel.

6. The trap of claim 1 further including a trap door extending across the opening between the overhead tunnel and the second cage, and means for urging the trap door to a closed horizontal position, the door opening downwardly into the second cage under the weight of a bird stepping on the door.

* * * * *